(12) United States Patent
Godet et al.

(10) Patent No.: US 11,436,880 B2
(45) Date of Patent: Sep. 6, 2022

(54) METHOD FOR ESTIMATING THE DISTANCE SEPARATING AN AUTHENTICATION DEVICE AND A MOTOR VEHICLE

(71) Applicants: Continental Automotive France, Toulouse (FR); Continental Automotive GmbH, Hannover (DE)

(72) Inventors: Sylvain Godet, Toulouse (FR); Dawid Durka, Toulouse (FR); Rachid Benbouhout, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 17/294,060

(22) PCT Filed: Dec. 10, 2019

(86) PCT No.: PCT/EP2019/084359
§ 371 (c)(1),
(2) Date: May 14, 2021

(87) PCT Pub. No.: WO2020/120445
PCT Pub. Date: Jun. 18, 2020

(65) Prior Publication Data
US 2021/0407228 A1    Dec. 30, 2021

(30) Foreign Application Priority Data
Dec. 11, 2018   (FR) ...................................... 1872720

(51) Int. Cl.
*G07C 9/00* (2020.01)
*G01S 13/08* (2006.01)
*G01S 13/76* (2006.01)

(52) U.S. Cl.
CPC .......... *G07C 9/00309* (2013.01); *G01S 13/08* (2013.01); *G01S 13/765* (2013.01)

(58) Field of Classification Search
CPC .... G07C 9/00309; G01S 13/08; G01S 13/765
See application file for complete search history.

(56) References Cited

U.S. PATENT DOCUMENTS

| 10,578,731 B2 | 3/2020 | Pature et al. |
| 2007/0139200 A1* | 6/2007 | Yushkov .............. H04B 1/0003 340/8.1 |

(Continued)

FOREIGN PATENT DOCUMENTS

FR    3042631 A1    4/2017

OTHER PUBLICATIONS

Bensky. "Time Transfer", Wireless Positioning Technologies and Applications, Chapter 4, 2008, pp. 95-105.

(Continued)

*Primary Examiner* — Omeed Alizada
(74) *Attorney, Agent, or Firm* — RatnerPrestia

(57) ABSTRACT

A method for estimating the distance between an authentication device and a vehicle, in particular a motor vehicle, the vehicle including a computer and a plurality of communication modules capable of communicating with the device by exchanging signals over a wireless communication link, each communication module including an electronic clock that defines the sampling frequency of the signals received from the device. The method includes a plurality of measurement phases each comprising determination, by the computer, of the distance between the vehicle and the device and stopping and restarting of the electronic clock, and estimation of the actual distance between the vehicle and the device based on the plurality of distances determined during the measurement phases.

11 Claims, 5 Drawing Sheets

(56) References Cited

U.S. PATENT DOCUMENTS

2017/0272906 A1* 9/2017 Kerai ................... H04W 12/06
2019/0004168 A1* 1/2019 Pature .................. G01S 13/931

OTHER PUBLICATIONS

International Search Report and Written Opinion for International Application No. PCT/EP/2019/084359, dated Feb. 11, 2020, 3 pages.
International Search Report and Written Opinion for International Application No. PCT/EP2019/084359, dated Feb. 11, 2020, 14 pages (French).

* cited by examiner

METHOD FOR ESTIMATING THE DISTANCE SEPARATING AN AUTHENTICATION DEVICE AND A MOTOR VEHICLE

CROSS REFERENCE TO RELATED APPLICATIONS

This application is the U.S. National Phase Application of PCT International Application No. PCT/EP2019/084359, filed Dec. 10, 2019, which claims priority to French Patent Application No. 1872720, filed Dec. 11, 2018, the contents of such applications being incorporated by reference herein.

FIELD OF THE INVENTION

The invention relates to detection systems for motor vehicles, and more particularly to a method and to a computer for estimating the distance between an authentication device and a vehicle in order in particular to remotely activate functions of said vehicle.

BACKGROUND OF THE INVENTION

Nowadays, some motor vehicles are equipped with a detection system allowing a device carried by the user to be authenticated remotely, for example an electronic ignition key or fob, in order to implement certain functions from outside said vehicle. For example, such a detection system may be used in order to unlock the opening elements of the vehicle, in particular the passenger doors or the trunk, or to activate welcoming functions, such as for example ambient lighting or adjustment of the seats.

For security reasons, it is known practice to configure the system so as to activate these functions only when the user is located at a distance less than a predetermined distance, called "detection distance", which depends on the function to be activated. For example, a function of unlocking the opening elements may be activated only when the user is located within two meters of the vehicle. Again for example, a welcoming lighting function may be activated only when the user is located within five meters of the vehicle or a request to maneuver the vehicle, commonly called "remote parking", may be activated only when the user is located within six meters of the vehicle.

In one known solution, the vehicle and the device communicate over LF/RF (Low Frequency/Radiofrequency) wireless communication links. In this solution, the vehicle periodically transmits a detection signal over an LF communication link. When the device receives this detection signal, it responds to the vehicle over an RF communication link in order to authenticate itself. In order to determine the distance between the user and the vehicle, the vehicle measures the power of the signals received from the authentication device during these exchanges and deduces the distance therefrom. The advantage of this type of technology is that the propagation of the signals is not impacted by mechanical elements such as the vehicle body.

For practical reasons, it is nowadays known practice to use a smartphone to authenticate oneself to the vehicle. However, the majority of smartphones used nowadays do not have an LF/RF communication interface. In order to rectify this drawback, it is known practice to use a Bluetooth® communication interface, in particular a BLE (Bluetooth® Low Energy) interface, present on the majority of modern smartphones. The exchanges are carried out on such an interface using frames encoded in a signal called a "BLE signal".

In order to determine the distance between the device and the vehicle, the vehicle receives the BLE signals transmitted by the smartphone and determines the power thereof, for example by measuring a received signal strength indication (RSSI) in order to deduce the distance therefrom. However, as is known and commonly the case, the RSSI measurement may be distorted when the signal sent by the smartphone splits into a signal received in a direct line and one or more signals that bounce off one or more obstacles before reaching the vehicle (called a "multipath" signal). In this case, the power of the combined signal received by the vehicle may be either greater than or less than the actual value of the signal received in a direct line, thereby distorting the estimation of the distance.

In order to rectify this drawback, it is known practice to determine the distance between the vehicle and the device by evaluating the communication time of the signals between the vehicle and the device. To this end, it is known practice to have the vehicle transmit what is called a "request" signal, the device responding in a known manner with what is called a "response" signal after a predetermined period of 150 microseconds in the BLE protocol. The vehicle, knowing the instant of transmission of the request signal, the period between the reception of the request signal and the transmission of the response signal by the device and the instant of reception of the response signal, then deduces therefrom the average time of flight of the signals and the distance between the vehicle and the device.

As is known, the BLE communication modules of the vehicle filter and sample each received signal and detect that a signal is a BLE signal when a predetermined signal power detection threshold has been exceeded, the exceedance of this threshold being detected only at the time of a sample of said signal. FIG. 1 shows the superimposition of one example of a response signal that is unfiltered and noise-free A and, by way of comparison, of the same response signal in filtered form B and also of said response signal in filtered and sampled form C, the power P of these signals being shown as a function of time t. The response signal RESP in filtered and sampled form C is detected when one c1 of the samples exceeds the predetermined detection threshold Sd.

The time interval between two samples therefore determines the maximum error that is able to occur on the distance measurement. By way of example, using a quartz clocked at 24 MHz for sampling the BLE signal leads to an error of plus or minus 6.25 meters, thereby exhibiting a significant drawback, or even a major one if it is necessary to detect the user within 2, 5 or 6 meters of the vehicle in order to activate certain functions thereof.

In addition, the receiver may receive multiple signals for one and the same signal sent by the transmitter, since said signal may bounce off obstacles when it propagates, thus creating multiple components of the same signal. In this case, the detection is carried out on one of the received signals, the first one for which exceedance of the threshold on the sample is detected, which may again cause an error on the estimation of the actual distance between the transmitter and the receiver. This type of detection system therefore has notable technical limitations that may at times render it ineffective.

SUMMARY OF THE INVENTION

An aspect of the invention is therefore to at least partly rectify these drawbacks by proposing a simple and reliable solution for estimating the distance between a vehicle and an authentication device and effectively remotely activating functions of a vehicle.

To this end, one aspect of the invention is a method for estimating the distance between a vehicle, in particular a motor vehicle, and an authentication device, said vehicle comprising a computer and a plurality of communication modules each capable of communicating with said device using signals exchanged over a wireless communication link, each communication module comprising an electronic clock that defines the sampling frequency of the signals received from the device, said method being noteworthy in that it comprises:

a plurality of measurement phases each comprising:
determination, by the computer, of the distance between the vehicle and the device,
stopping and restarting, preferably at a random instant, of the electronic clock,
estimation of the actual distance between the vehicle and the device based on the plurality of distances determined during the measurement phases.

The term "actual distance" is understood to mean the refined distance resulting from the estimation made based on the plurality of determined distances.

The method according to an aspect of the invention makes it possible to efficiently estimate the actual distance between the vehicle and the device by virtue of restarting the electronic clock, which makes it possible to modify the sampling instants of the signals received from the authentication device in a random manner and thus to reduce the error on the estimation of the distance, in particular by diluting it over the number of measurements.

Estimating the actual distance preferably consists in calculating the average or the median of the distances determined in the measurement phases.

According to one aspect of the invention, the method is repeated at least 10 times, preferably at least 30 times, more preferably at least 100 times in order to refine the estimation of the actual distance in line with the measurement phases. Such iterations make it possible to refine the estimation of the distance so as to make it relatively accurate and for example reduce the error to less than two meters beyond around thirty iterations, or even to less than 50 centimeters beyond a few hundred iterations.

The step of the method of restarting the electronic clock is preferably carried out at the end of a predetermined delay period after the distance has been determined.

In one embodiment, the step of determining the distance in a measurement phase comprises:
transmission, by at least one of the communication modules, of a request signal destined for the device at a first instant,
reception of said request signal by the device,
transmission, by the device, of a response signal destined for at least one of the communication modules of the vehicle,
reception, by at least one of the communication modules, of said response signal at a second instant defined on the basis of the sampling frequency of the electronic clock,
determination, by the computer, of the time that has elapsed between the first instant and the second instant,
determination, by the computer, of the distance based on the calculated time that has elapsed between the first instant and the second instant.

The measurement phases are preferably carried out on a series of signals received consecutively by the communication modules.

In one embodiment, the electronic clock is a piezoelectric element. However, it goes without saying that any type of clock suitable for this application could be used.

Advantageously, the sampling frequency of each communication module is less than 50 MHz, preferably of the order of 24 MHz, this frequency of 24 MHz being commonly used in piezoelectric elements of detection systems.

Advantageously, the method comprises, between two measurement phases, a step of saving the determined distance values in a memory area of the computer, the actual distance then being able to be estimated based on the saved determined distance value or values.

Each measurement phase preferably comprises, prior to the step of transmission, by at least one of the communication modules, of a request signal destined for the device, a step of transmission of a detection signal by the device and destined for the vehicle.

The method preferably comprises, following the step of estimating the actual distance, a step of activation, by the computer, of at least one function of the vehicle when the estimated actual distance is less than a predetermined distance, for example two, five or six meters.

The wireless communication link preferably makes it possible to exchange signals in the UHF (Ultra High Frequencies) frequency band between 300 and 3000 MHz. Again preferably, the wireless communication link operates in accordance with the BLE (Bluetooth® Low Energy) standard.

An aspect of the invention also relates to a vehicle computer, in particular a motor vehicle computer, for estimating the distance between a vehicle and an authentication device, said vehicle comprising a plurality of communication modules each capable of communicating with said device by exchanging signals over a wireless communication link, each communication module comprising an electronic clock that defines the sampling frequency of the signals received from the device, said computer being configured so as to:

in a plurality of measurement phases:
determine the distance between the vehicle and the device,
command the stopping and restarting, preferably at a random instant, of the electronic clock,
estimate the actual distance between the vehicle and the device based on the plurality of distances determined during the measurement phases.

According to one aspect of the invention, the computer is configured so as to estimate the actual distance by calculating the average or the median of the distances determined in the measurement phases.

The computer is preferably configured so as to restart the electronic clock at the end of a predetermined delay period after the distance has been determined.

In one embodiment, the computer is configured so as to determine the time that has elapsed between a first instant of transmission, by at least one of the communication modules, of a request signal destined for the device and a second instant of reception, by at least one of the communication modules, of a response signal defined on the basis of the sampling frequency of the electronic clock, and to determine the distance between the vehicle and the device based on the calculated time that has elapsed between the first instant and the second instant.

In one embodiment, the electronic clock is a piezoelectric element. However, it goes without saying that any type of clock suitable for this application could be used.

An aspect of the invention also relates to a vehicle comprising at least one computer and a plurality of communication modules each capable of communicating with said device.

According to one aspect of the invention, the sampling frequency of each communication module of the vehicle is less than 50 MHz, preferably of the order of 24 MHz.

An aspect of invention also relates to a detection system comprising a vehicle as presented above and an authentication device capable of communicating with the plurality of communication modules of said vehicle.

Preferably, with the authentication device comprising a communication unit configured so as to exchange signals with the communication modules, the communication modules and the communication unit are configured so as to communicate on a communication interface operating in the UHF (Ultra High Frequencies) frequency band between 300 and 3000 MHz. More preferably, this communication interface uses BLE (Bluetooth® Low Energy) technology.

BRIEF DESCRIPTION OF THE DRAWINGS

Other features and advantages of aspects of the invention will become apparent from the following description, which is given with reference to the appended figures, which are given by way of non-limiting examples and in which identical references are given to similar objects.

DETAILED DESCRIPTION OF THE PREFERRED EMBODIMENTS

The detection system according to an aspect of the invention is intended to be installed in a vehicle, in particular a motor vehicle, in order to detect an authentication device carried by a user of said vehicle.

Such an authentication device may be for example in the form of a fob, an electronic ignition key or a smartphone, in order to allow the user to authenticate himself to the vehicle in order to implement certain functions. For example, such a detection system may be used in order to implement a vehicle lighting function or else a function of unlocking the opening elements of the vehicle, for example the passenger doors or the trunk.

For security reasons, it is known practice to configure the system so as to activate these functions only when the user is located at a distance less than a predetermined distance, called "detection distance", which depends on the function to be activated. For example, the unlocking function may be activated only when the user is located within two meters of the vehicle.

Figure 1:
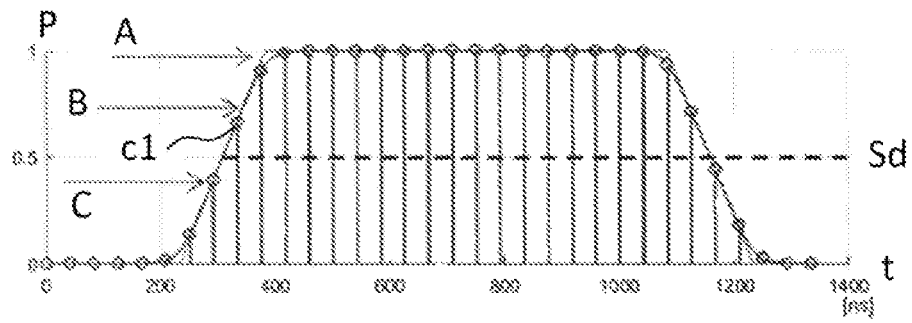
FIG. 1 graphically illustrates the detection of a signal received by a communication module from the prior art.
Figure 2:
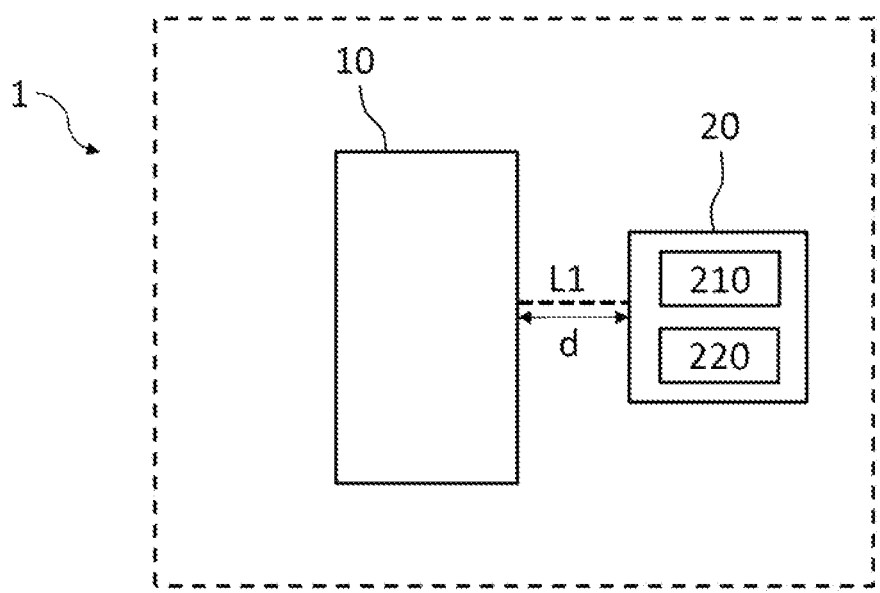
FIG. 2 schematically illustrates a detection system according to an aspect of the invention.
Figure 3:
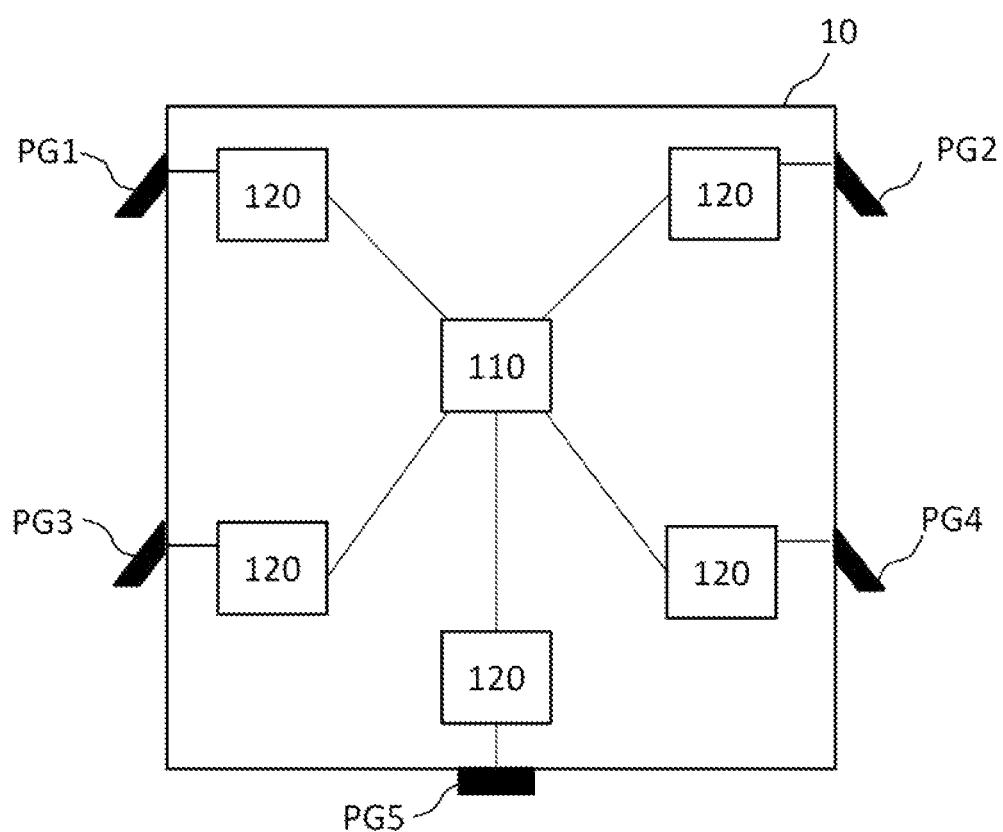
FIG. 3 schematically illustrates a vehicle according to an aspect of the invention.

FIG. 2 schematically shows a detection system 1 according to an aspect of the invention. The detection system 1 comprises a vehicle 10 and an authentication device 20. With reference to FIG. 3, the vehicle 10 comprises a computer 110, for example an ECU (Electronic Control Unit), and a plurality of communication modules 120.

Again with reference to FIG. 2, the authentication device 20 comprises a management module 210 and a communication unit 220. The authentication device 20 is preferably a smartphone, without this limiting the scope of an aspect of the present invention.

The communication modules 120 and the communication unit 220 are preferably configured so as to communicate on a communication interface operating in the UHF (Ultra High Frequencies) frequency band between 300 and 3000 MHz. More preferably, this communication interface uses BLE (Bluetooth® Low Energy) technology. BLE technology allows in particular low-energy communication and is advantageously integrated into the majority of modern smartphones. Since BLE technology is known per se, it will not be described in more detail here.

An aspect of the invention will be described below in terms of its application to the unlocking of the opening elements of the vehicle 10, without this limiting the scope of an aspect of the present invention.

If the vehicle 10 is unlocked with manual activation of a handle of opening elements of the vehicle 10, the number of communication modules 120 is advantageously equal to the number of opening element handles of said vehicle 10. For example, with reference to FIG. 2, a vehicle 10 comprises five opening elements, four passenger doors and the door of the trunk, respectively having a handle PG1, PG2, PG3, PG4 and PG5, each handle PG1, PG2, PG3, PG4, PG5 being connected both to a dedicated communication module 120 and to the computer 110.

Figure 4:
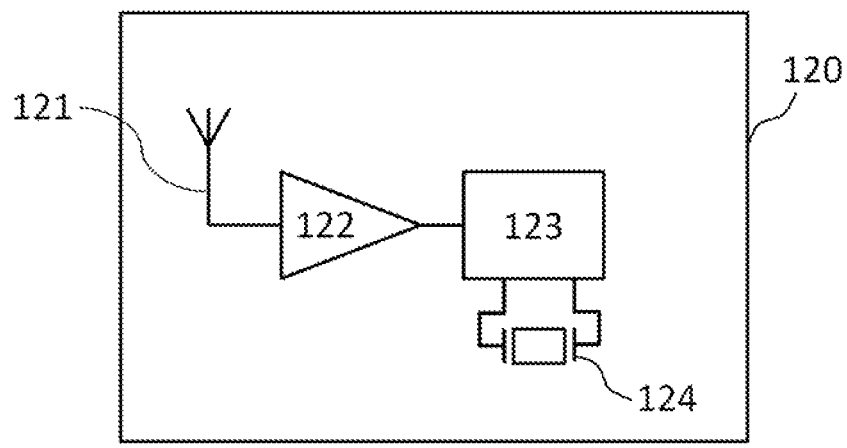
FIG. 4 schematically shows one embodiment of a communication module according to an aspect of the invention.

With reference to FIG. 4, each communication module 120 on board the vehicle 10 comprises an antenna 121, an amplifier 122, a baseband circuit 123 and an electronic clock, in this example in the form of a piezoelectric element 124.

The antenna 121 makes it possible to receive the signals sent by the device 20 or to transmit signals destined for the device 20 over the wireless communication link L1.

The amplifier 122 makes it possible to amplify the received signals, which have an attenuated power owing to their propagation through the air. By way of example, the amplifier 122 may be a low-noise amplifier, commonly abbreviated to "LNA" by a person skilled in the art.

The baseband circuit 123 makes it possible to sample the received signals, that is to say to digitize them, such that they are able to be used by the computer 110.

The piezoelectric element 124 comprises a quartz clocked at a predetermined frequency, for example 24 MHz, in order to allow the baseband circuit 123 to sample the signals at said frequency.

Figure 5:
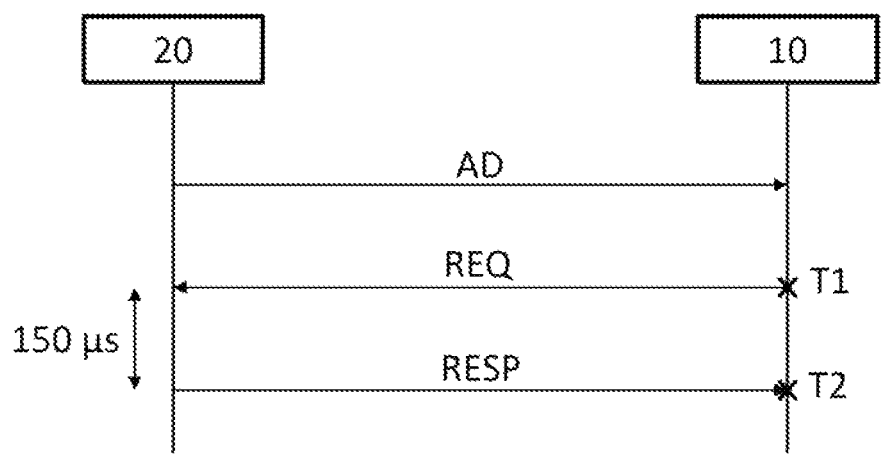
FIG. 5 schematically shows the exchanges of signals between a vehicle and a device according to an aspect of the invention.

With reference to FIG. 5, the baseband circuit 123 is furthermore configured so as to detect, at a second instant T2, a noisy response signal RESP, sent in response to a request signal REQ transmitted beforehand by the antenna 121 at a first instant T1, when the amplitude of said noisy and delayed response signal exceeds a predetermined detection threshold Sd. The request signal REQ is transmitted by the antenna 121 following the reception of a detection signal AD transmitted by the communication unit 220 of the authentication device 20. The baseband circuit 123 is furthermore configured so as to send the value of the second detected instant T2 to the computer 110, so that said computer 110 estimates the distance between the vehicle 10 and the device 20.

To this end, with continuing reference to FIG. 5, the computer 110 of the vehicle 10 is configured so as to command the transmission, by at least one of the communication modules 120, of a request signal REQ destined for the device 20 at a first instant T1, to receive, from at least one communication module 120, the value of a second instant T2 detected by said at least one communication module 120, to calculate the time that has elapsed between the first instant T1 and the second instant T2, and to estimate the distance between the vehicle 10 and the device 20 based on the calculated time.

In one preferred embodiment, the computer 110 is configured so as to save the determined distance values in a memory area and to calculate what is called an "actual" distance, based on the plurality of stored determined distances, for example by calculating the median or the average of said estimated distances.

The computer 110 is preferably configured so as to calculate the actual distance once the number of determined distances has exceeded what is called an "acquisition" threshold. This acquisition threshold is preferably greater than 10, 30 or even 100 in order to refine the estimation of the actual distance in line with the measurement phases. Such iterations make it possible to refine the estimation of the distance so as to make it relatively accurate and reduce the value of the error, preferably to less than 50 centimeters.

Lastly, the computer 110 is configured so as to activate at least one function of the vehicle 10 when the estimated distance is less than a predetermined distance, for example two, five or six meters.

An aspect of the invention will now be described in terms of its implementation.

First of all, with reference to FIG. 5, with the opening elements of the vehicle 10 being locked and the engine being at a standstill, in particular when the vehicle 10 is parked, the management module 210 of the device 20 commands the communication unit 220 such that said communication unit 220 periodically transmits a detection signal AD, called "advertising" signal by a person skilled in the art, for example with a period of between 20 milliseconds and 10.24 seconds.

When at least one of the communication modules 120 is within the radio coverage of the device 20 and receives this detection signal AD, the computer 110 responds to the device 20 and commands, at a first instant T1, the transmission of a request signal REQ by at least one of the communication modules 120 in order to ask the device 20 for its identifier in order to authenticate it. The computer 110 records the value of the first instant T1 and awaits the response from the device 20.

At the end of a predefined period of 150 μs after receiving the request signal REQ, the management module 210 of the device 20 commands the transmission of a response signal RESP, comprising in particular the identifier of the device 20 so that the vehicle 10 authenticates it.

Upon reception, via at least one of the communication modules 120, of this response signal RESP by the computer 110 at a second instant T2, said computer 110 records said second instant T2 and calculates the average time of flight of the signals, which corresponds to the period that has elapsed between the first instant T1 and the second instant T2 minus 150 μs, divided by two.

The computer 110 then determines the distance d (FIG. 2) between the vehicle 10 and the device 20 between these two instants using the following formula:

$$d = c \cdot \left[ \left( \frac{T2 - T1}{2} \right) - 0.00015 \right] \quad \text{[Math. 1]}$$

where "d" is the distance in meters, "c" is the speed of light, "T1" and "T2" are given in seconds, 0.00015 seconds (150 microseconds) corresponding to the predefined period between the reception of the request signal REQ and the transmission of the response signal RESP.

According to an aspect of the invention, when the distance d has been determined by the computer 110, the computer 110 commands the stopping and restarting of the piezoelectric element 124 of the communication module or modules 120 that have received the signals (or else all of the communication modules 120).

The signal exchanges for determining the distance d and the restarting of the piezoelectric element 124 form a sequence, called measurement phase, which is repeated regularly, at the periodic transmission frequency of the detection signal AD.

The computer 110 estimates the actual distance between the vehicle 10 and the device 20 based on the distances d determined in each measurement phase. This actual distance estimated beforehand is preferably the average or the median of the distances determined during the previous measurement phases, preferably at least the 10 or 100 previous measurement phases.

It goes without saying that the computer 110 may calculate the actual distance after each measurement phase, that is to say based on the actual distance calculated in the previous measurement phase and on the distance determined in the current measurement phase, rather than storing all of the distances determined during a number of consecutive measurement phases and then calculating the actual distance.

For each measurement phase, the baseband circuit 123 samples the response signal RESP and determines the second instant T2 when the power value of one of the samples of said response signal RESP exceeds a predetermined detection threshold Sd. The baseband circuit 123 stops and then restarts the piezoelectric element 124 in a random manner between two signal exchange sequences, such that the sampling instants of the following sequence differ from those of the previous sequence. As a result, the detection of the exceedance of the detection threshold Sd will vary in a random manner between the sequences, such that the error on the estimation of the actual distance tends toward zero when the number of measurement phases increases, thus significantly improving the accuracy of the detection system 1.

If the estimated distance is less than the detection distance, this will trigger one or more functions implemented remotely by the vehicle 10, for example unlocking the opening elements of said vehicle 10 when the estimated distance is less than two meters. In the opposite case, if the estimated distance is greater than the detection distance, the associated function or functions of the vehicle 10 remain inactive.

Figure 6:
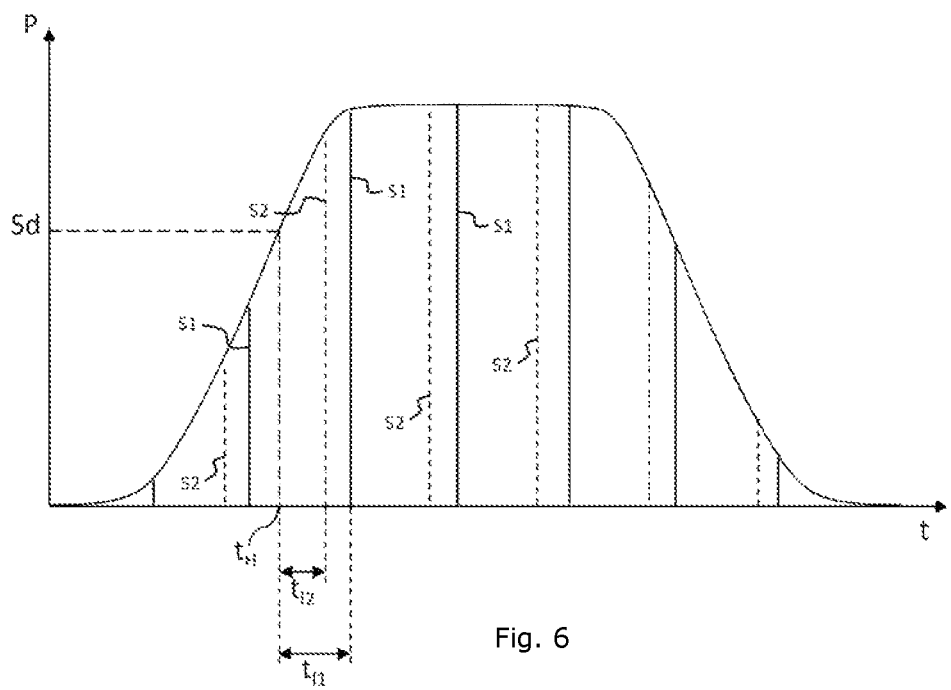
FIG. 6 graphically illustrates the variation in power as a function of time of two signals received by the communication module according to an aspect of the invention.

By way of example, with reference to FIG. 6, this graphically shows the variation in the power P of a first sampled received signal S1 sampled by the computer 110 and of a second sampled received response signal S2 as a function of time t. It will be noted that the two signals are received for two consecutive measurement phases, but that the sampled received signals are superimposed on the same time scale in order to show the offset generated by stopping and restarting the piezoelectric element 124.

In this example, it is seen that the first sample of the first signal 51 exceeding the detection threshold Sd for the reception of a signal occurs at the end of a first latency time tl1 following the time instant $t_H$ corresponding to said detection threshold Sd.

Randomly stopping and restarting the piezoelectric element 124 makes it possible to shift the detection of the exceedance of the detection threshold Sd by the second signal S2 to a second latency time tl2, different from the first latency time tl1. It will be noted that the piezoelectric element 124 is restarted at a random instant between the reception of the two signals by the device 20.

Therefore, when the computer 110 takes the average or the median of the distances determined at these two different instants, it generates a refined estimation of the actual distance between the vehicle 10 and the device 20. This value is all the more refined as the number of measurement phases, that is to say the number of stops and restarts, increases.

Figure 7:
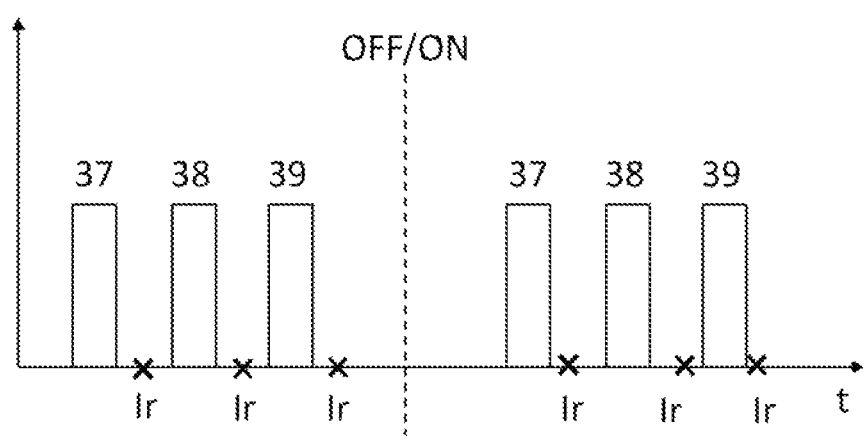
FIG. 7 schematically illustrates a comparison between the instants of restarting the electronic clock of a communication module from the prior art and of a communication module according to an aspect of the invention.

Moreover, in the case of the BLE protocol, with reference to FIG. 7, it is known practice to alternately use three channels of different frequencies numbered 37, 38 and 39. In the solutions from the prior art, a signal is detected statically between two values of the sampled received signal (left-hand part OFF in FIG. 7), that is to say at the same instant of detection Ir for each measurement phase, whereas, with an aspect of the invention, randomly restarting the piezoelectric element 124 makes it possible to modify the instant of detection Ir between two values of the sampled received signal (right-hand part ON in FIG. 7), thereby making it possible to reduce the error on the estimation of the distance between the vehicle 10 and the device 20, specifically all the more so when the number of random restarts (that is to say iterations of the method according to an aspect of the invention) is high.

Figure 8:
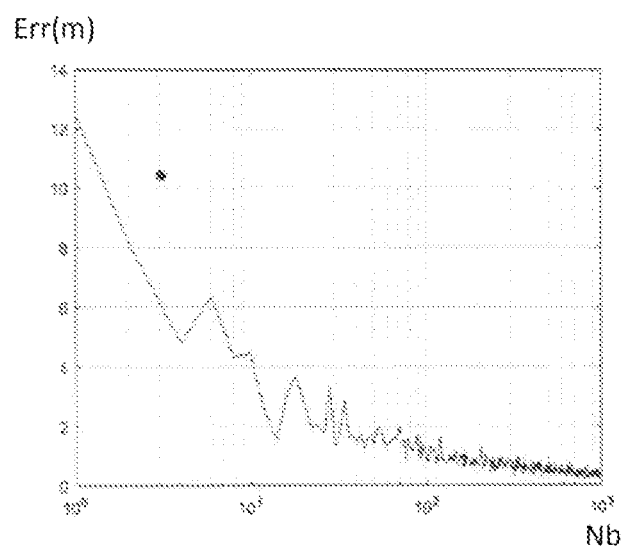
FIG. 8 illustrates one example of testing the method according to an aspect of the invention, which describes the evolution of the error on the distance as a function of the number of iterations of the method.

FIG. 8 shows one example of testing the method according to an aspect of the invention, which describes the evolution of the error Err (in meters) on the distance as a function of the number Nb of iterations of the method. In this example, it is observed that the error systematically becomes less than 2 meters beyond about 35 iterations.

Figure 9:
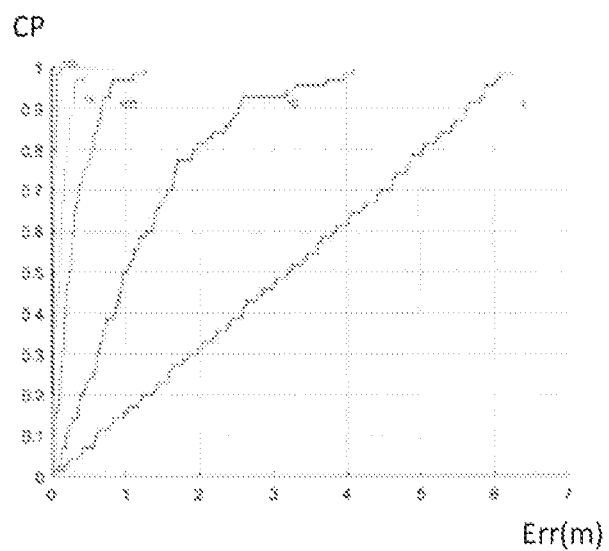
FIG. 9 illustrates one example of testing the method according to an aspect of the invention, which describes the evolution of cumulative probability as a function of the error on the distance.

FIG. 9 shows one example of testing the method according to an aspect of the invention, which describes the evolution of cumulative probability CP as a function of the error Err on the distance (in meters). Five curves are shown, produced respectively with 1, 10, 100, 1000 and 10 000 iterations. In this example, it is observed that, after 100 iterations, the localization error is at a median of the order of 20 cm (that is to say the cumulative probability is equal to 0.5 on the curve of 100 iterations), which has a significant advantage in comparison with known solutions.

The method according to an aspect of the invention therefore advantageously makes it possible to reduce the error on the estimation of the actual distance between the vehicle 10 and the authentication device 20 by simply restarting the electronic clock after each reception of a signal sent by the device, that is to say without modifying the hardware architecture of the vehicle, in particular of the communication modules.

The invention claimed is:

1. A method for estimating a distance between a vehicle and an authentication device, said vehicle comprising a computer and a plurality of communication modules each capable of communicating with said device by exchanging signals over a wireless communication link, each communication module comprising an electronic clock that defines a sampling frequency of the signals received from the device, said method being comprising:
   a) a plurality of measurement phases each comprising determination, by the computer, of the distance between the vehicle and the device based on a timing of when a sample of a signal of the signals exchanged between at least one of the communication modules and the device exceeds a detection threshold,
   b) between each of the plurality of measurement phases stopping and restarting of the electronic clock in a random manner as a result of said distance determination to add a random time shift to the sample for each of the plurality of measurement phases, the random time shift resulting in a random distance shift to the distance computed during each of the plurality of measurement phases, and
   c) estimating an actual distance between the vehicle and the device based on the plurality of distances determined during each of the plurality of measurement phases.

2. The detection method as claimed in claim 1, wherein estimating the actual distance comprises calculating the average or the median of the distances determined in the measurement phases.

3. The detection method as claimed in claim 1, wherein the method is repeated at least 10 times.

4. The detection method as claimed in claim 1, wherein the electronic clock is restarted at the end of a predetermined delay period after the distance has been determined.

5. The detection method as claimed in claim 1, wherein determining the distance in a measurement phase comprises:
   transmission, by at least one of the communication modules, of a request signal destined for the device at a first instant,
   reception of said request signal by the device,
   transmission, by the device, of a response signal destined for at least one of the communication modules of the vehicle,
   reception, by at least one of the communication modules, of said response signal at a second instant defined on the basis of the sampling frequency of the electronic clock,
   determination, by the computer, of the time that has elapsed between the first instant and the second instant, and
   determination, by the computer, of the distance between the vehicle and the device based on the calculated time that has elapsed between the first instant and the second instant.

6. A vehicle computer for estimating a distance between a vehicle and an authentication device, said vehicle comprising a plurality of communication modules each capable of communicating with said device by exchanging signals over a wireless communication link, each communication module comprising an electronic clock that defines the sampling frequency of the signals received from the device, said computer configured so as to:
- a) in a plurality of measurement phases:
  - i) determine the distance between the vehicle and the device based on a timing of when a sample of a signal of the signals exchanged between at least one of the communication modules and the device exceeds a detection threshold,
  - ii) between each of the plurality of measurement phases, command the stopping and restarting of the electronic clock in a random manner as a result of said distance determination to add a random time shift to the sample for each of the plurality of measurement phases, the random time shift resulting in a random distance shift to the distance computed during each of the plurality of measurement phases, and
- b) estimate the actual distance between the vehicle and the device based on the plurality of distances determined during each of the plurality of measurement phases.

7. The computer as claimed in claim 6, said computer being configured so as to estimate the actual distance by calculating the average or the median of the distances determined in the measurement phases.

8. The computer as claimed in claim 6, said computer being configured so as to restart the electronic clock at the end of a predetermined delay period after the distance has been determined.

9. A vehicle comprising at least one computer as claimed in claim 6 and a plurality of communication modules each capable of communicating with said device.

10. A detection system comprising a vehicle as claimed in claim 9 and an authentication device capable of communicating with the plurality of communication modules of said vehicle.

11. The computer as claimed in claim 7, said computer being configured so as to restart the electronic clock at the end of a predetermined delay period after the distance has been determined.

* * * * *

UNITED STATES PATENT AND TRADEMARK OFFICE
CERTIFICATE OF CORRECTION

| | |
|---|---|
| PATENT NO. | : 11,436,880 B2 |
| APPLICATION NO. | : 17/294060 |
| DATED | : September 6, 2022 |
| INVENTOR(S) | : Sylvain Godet et al. |

It is certified that error appears in the above-identified patent and that said Letters Patent is hereby corrected as shown below:

In the Claims

In Column 10, Line 15, "being" should be deleted.

Signed and Sealed this
Twenty-fifth Day of October, 2022

Katherine Kelly Vidal
*Director of the United States Patent and Trademark Office*